United States Patent [19]

Takahashi

[11] Patent Number: 5,051,850
[45] Date of Patent: Sep. 24, 1991

[54] DISC UNIT HAVING A CENTRAL CONTROL FOR CONTROL PLURAL DISC DRIVES

[75] Inventor: Kazushi Takahashi, Yokoze, Japan

[73] Assignee: Canon Denshi Kabushiki Kaisha, Chichibu, Japan

[21] Appl. No.: 311,822

[22] Filed: Feb. 16, 1989

[30] Foreign Application Priority Data

Feb. 18, 1988 [JP] Japan .................................. 63-19322

[51] Int. Cl.$^5$ .............................................. G11B 15/46
[52] U.S. Cl. ................................ 360/73.03; 360/78.04
[58] Field of Search .................... 360/73.03, 36.1, 15,
360/69, 77.02, 78.04, 98.01, 98.04–98.06

[56] References Cited

U.S. PATENT DOCUMENTS

| | | |
|---|---|---|
| 3,911,484 | 10/1975 | Mutou et al. |
| 4,563,715 | 1/1986 | Kawamura et al. |
| 4,618,897 | 10/1986 | Johnson ...................... 360/73.03 X |
| 4,658,307 | 4/1987 | Tsuyuguchi ................. 360/73.03 X |
| 4,764,812 | 8/1988 | Hamley ......................... 360/36.1 X |
| 4,862,411 | 8/1989 | Dishon ............................ 360/15 X |
| 4,910,614 | 3/1990 | Arai ...................................... 360/69 |

Primary Examiner—A. J. Heinz
Attorney, Agent, or Firm—Spencer & Frank

[57] ABSTRACT

A disc unit having a plurality of disc drive mechanisms each driving a disc connected in the daisy chain connection mode. The disc unit has a control circuit for controlling the plurality of disc drive mechanisms commonly. The control circuit is incorporated in one of the plurality of disc drive mechanisms to control it and the remaining disc drive mechanisms.

4 Claims, 3 Drawing Sheets

5,051,850

DISC UNIT HAVING A CENTRAL CONTROL FOR CONTROL PLURAL DISC DRIVES.3

BACKGROUND OF THE INVENTION

1. Field of the Invention

The present invention relates to a disc unit and more particularly a disc unit in which a plurality of disc drive mechanism each driving a respective disc, are connected in the form of a daisy chain.

2. Description of the Prior Art

The magnetic disc units such as floppy disc units have been widely used as an external storage devices for computers, word processors and the like. For example, a disc unit including a plurality of magnetic heads is diclosed in U.S. Pat. No. 3,911,484, and a disc unit including a plurality of discs is disclosed in U.S. Pat. No. 4,563,715. FIG. 1 illustrates an arrangement in which a plurality of magnetic disc drive mechanism are connected to an data processing unit which is a host unit.

In FIG. 1, reference numeral 2 represents a control circuit of the data processing unit, which comprises special ICs. The information processing unit is connected through this control circuit 2 to a plurality of floppy disc drive mechanisms 1a and 1b in the case of FIG. 1 (but many floppy disc drive mechanisms may be included as indicated by 1c and 1d).

First, the arrangement of the magnetic disc drive mechanisms 1a will be described. A floppy disc 11 mounted in a predetermined position in the disc drive mechanisms 1a is spun by a spindle motor 10. A magnetic head 14 is moved linearly in the radial direction on the substantially flat surface of the floppy disc 11 so that the head 14 can write data on or read data from tracks on the surface of a floppy disc 11. The magnetic head 14 is driven by a head driving motor 9, such as a step motor, and the position of the head 14 is determined by a rotational amount of the head driving motor 9. The head driving motor 9 in turn is controlled through a driver 7 by a drive control circuit 6.

A plurality of sensors are disposed around the floppy disc 11. These sensors comprises photosensors or the like to be described below.

First, reference numeral 8 represents a track-0-sensor. The track-0 sensor 8 is incorporated into the magnetic head driving system including the head driving motor 9 to detect that the magnetic head 14 is positioned at the track-0 (in general, the outermost track) of the floppy disc 11. An index sensor 12 detects an index hole formed at a portion of the driving system of the spindle motor 10 or at the floppy disc 11, and thereby the sensor 12 generates a pulse per rotation of the disc which is utilized as a sync signal in the data writing or reading mode.

The jacket or cassette of a floppy disc is formed with a write-protect notch for inhibiting the writing of data on the disc. A write-protect sensor 13 detects the notch condition, thereby prohibiting data from being written on the floppy disc 11 if the notch indicates it is write-protected.

The reading or writing of data by the magnetic head 14 is directly controlled by a read/write circuit 5 comprising an amplifier for amplifying the readout data or the writing data, an erasing circuit and so on. The above described motors and sensors are controlled by the drive control circuit 6. In response to a control signal from the data processing unit and to the states of the output signals from the sensors, the drive control circuit 6 controls the rotation of the head driving motor 9 and the spindle motor 10, and the reading/writing of the magnetic head through the read/write circuit 5.

The read/write circuit 5 is connected through an interface 4 and a connector 3 to the control circuit 2 of the data processing unit.

The magnetic disc drive mechanism 1b is substantially similar in arrangement to the magnetic disc drive mechanism 1a just described above. The same reference numerals with a prime are used in the magnetic disc drive mechanism 1b to designate those parts similar to the parts of the magnetic disc drive mechanism 1a.

In the above-described conventional arrangement, plurality of magnetic disc drive mechanisms 1a-1d (up to four drives) are connected by the daisy chain system. Next, the interchange of the signals between the data processing unit and the disc drive mechanisms will be described.

The power is supplied to respective disc drive mechanisms 1a-1d through a power supply line 15. In response to a selection signal transmitted through one of four signal lines 16, one of the magnetic disc drive mechanisms 1a-1d is selected. That is, when the data processing unit selects one of the magnetic disc drive mechanisms 1a-1d, one of the signal lines 16 is made active.

In general, the magnetic disc drive mechanisms are respectively provided with dip switchs for determining the acceptable selection signal. The interface 4 provides one of the four selection signals determined by such a dip switch through a drive select signal line 19 to the drive control circuit 6.

When the signal line 19 becomes active, the drive control circuit 6 carries out a process relative to writing data on or reading data from the floppy disc 11, and carries out other processes. Reference numeral 17 denotes a control signal line for transmitting an input signal to the disc drive, while reference numeral 18 denotes an output signal line for outputting the output signal from the disc drive.

In the case of the daisy chain connection system described above, the control mode by the data processing unit is applicable to each disc drive mechanism in the same manner, regardless of how many disc drive mechanism are connected.

In FIG. 1, the signal lines between the data processing unit and the disc drive mechanisms are branched, but in general, another connector on the side of the disc drive mechanisms is connected in parallel with the connector 3 so that the adjacent disc drive mechanisms are connected in parallel through a cable, which includes the signal lines by utilizing the firstmentioned connector. In the case of the above-described arrangement, the number of the disc drive mechanisms can be increased in a simple manner up to the number of the selection signal lines. Furthermore, the data information unit can select a desired one of a plurality of disc drive mechanisms without the need of special control.

However, in the case of the arrangement described above with reference to FIG. 1, as is clear from the arrangement of the magnetic disc drive mechanism 1b, all of the connected disc drive mechanismsmust have circuits which can operate independently. Therefore each of the disc drive mechanisms which are mounted within the data processing unit or are disposed outside it must be provided with two connectors 3 and one or more cables. Furthermore, each disc drive mechanism must comprise an internal circuit operating independently. As a result, the arrangement of the conventional disc unit is complicated, so that the disc unit is expensive and the above-described arrangement does not utilize space efficiently.

SUMMARY OF THE INVENTION

In view of the above, it is an object of the present invention to provide a disc unit which can substantially solve the above and other problems encountered in the conventional disc units, and which has a simple arrangement and inexpensive construction without adversely affecting the advantages of the daisy chain connection.

In a disc unit in accordance with the present invention, a plurality of disc drive mechanisms each driving a respective disc are connected according to the daisy chain connection system, and a control circuit for controlling a plurality of disc drive mechanisms commonly is incorporated into one of them so as to control not only the disc drive mechanism incorporating the control circuit but also the remaining disc drive mechanisms.

According to the present invention, a plurality of disc drive mechanisms can be controlled by a control circuit incorporated in one of them. In this case, it suffices to connect the signal lines for interfacing within the disc unit, so that the connectors and cables for connecting the signal lines to the data processing unit or the like can be decreased in number and the space utilization efficiency can be improved.

Furthermore, the control mode of the data processing unit or the like is substantially similar to that of the unit with the daisy chain connection system so that from the standpoint of software, the control is not adversely affected.

The above and other objects, effects, features and advantages of the present invention will become more apparent from the following description of embodiments thereof taken in conjunction with the accompanying drawings.

DETAILED DESCRIPTION OF PREFERRED EMBODIMENTS

Figure 2:
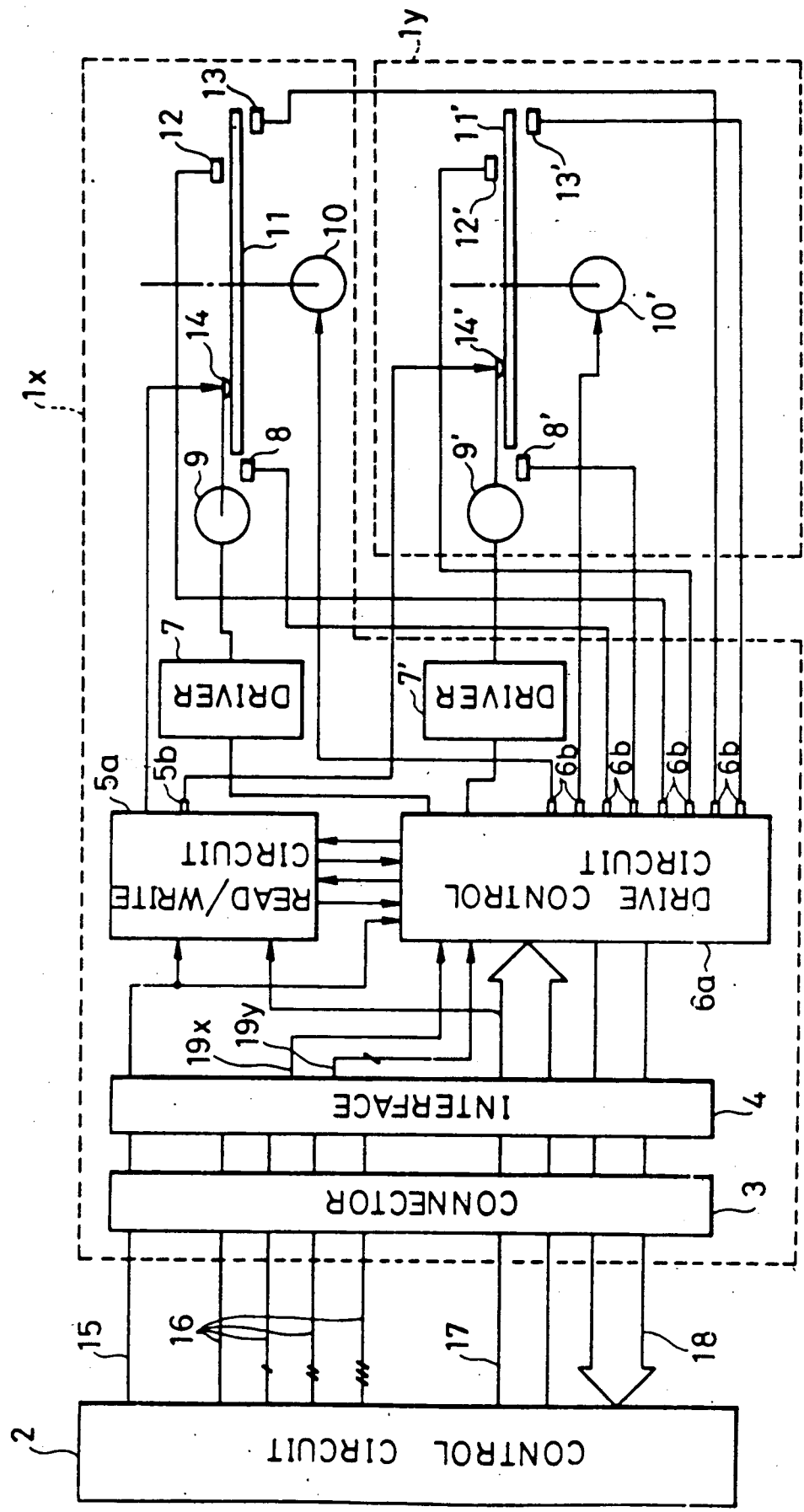
FIG. 2 is a block diagram showing an embodiment of a magnetic disc unit in accordance with the present invention.
Figure 3:
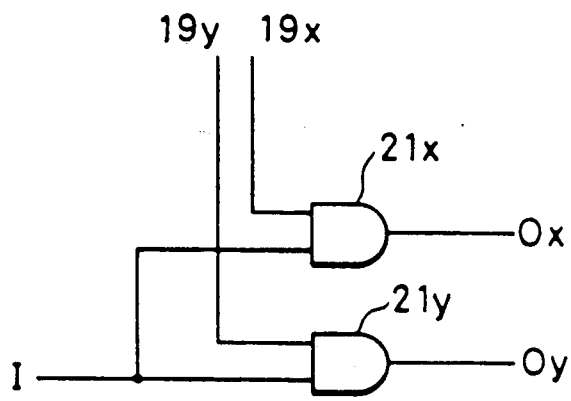
FIGS. 3 and 4 are block diagrams showing signal switching circuits used in a read/write circuit and a control circuit, respectively, of the unit shown in FIG. 2.
Figure 4:
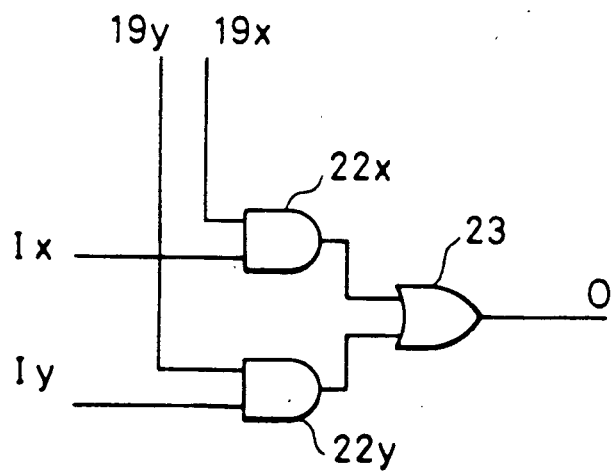

Referring now to FIGS. 2-4, an embodiment of the present invention will be described in detail hereinafter.

Figure 1:
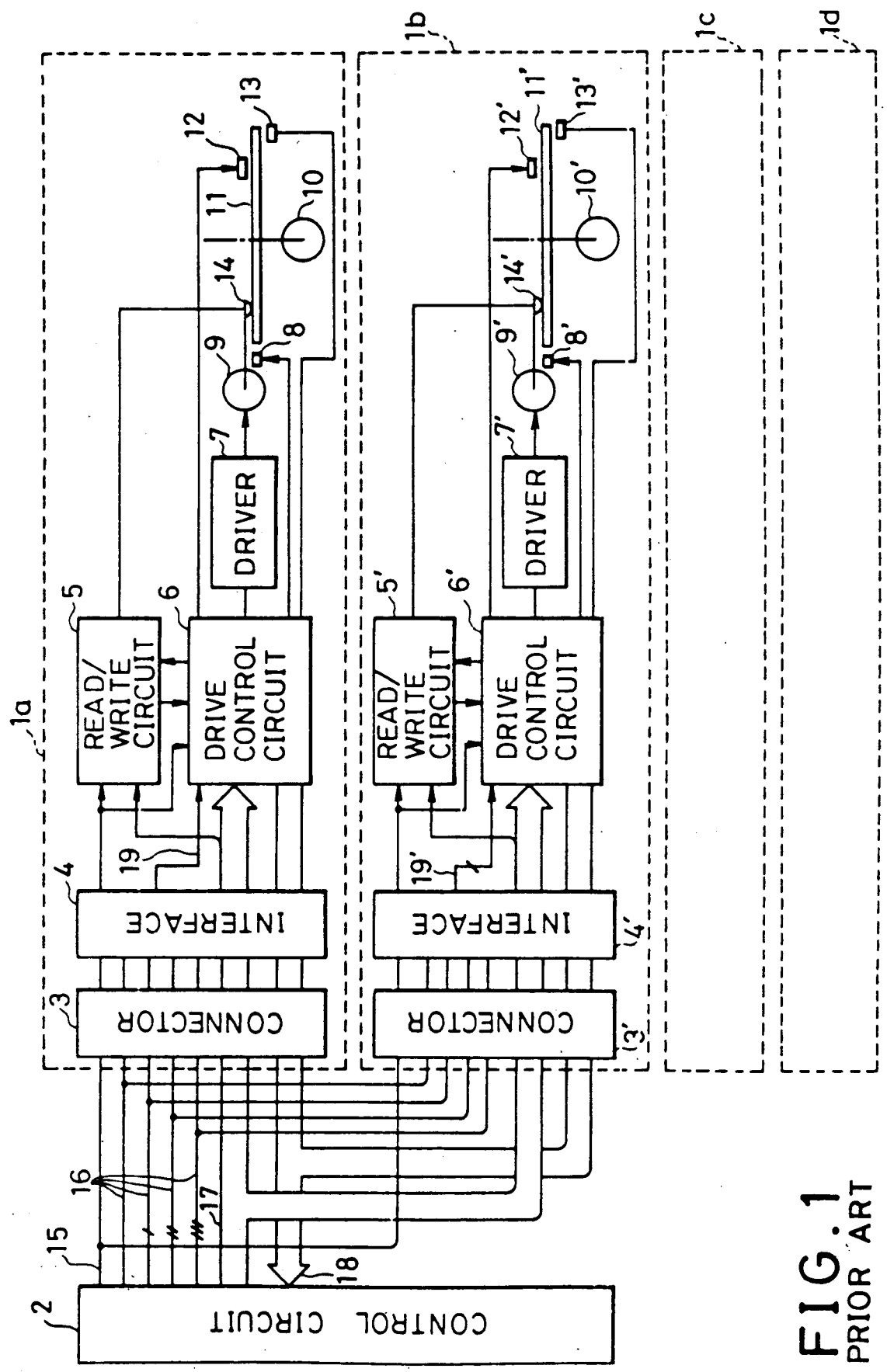
FIG. 1 is a block diagram showing an example of a conventional magnetic disc unit.

FIG. 2 illustrates an arrangement of a disc unit in accordance with the present invention. The same reference numerals are used to designate similar parts in both FIGS. 1 and 2, so that the parts which have been already explained shall not be described in detail hereinafter.

In FIG. 2, two magnetic disc drive mechanisms 1x and 1y are connected to a data processing unit such as a computer. The embodiment of the present invention has such an arrangement that the mechanical portions of the disc drive mechanisms 1x and 1y, that is, the motors and sensors illustrated around each floppy disc (11 and 11'), are independent, but are controlled commonly by a control circuit incorporated in the magnetic disc drive mechanism 1x. That is, the magnetic disc drive mechanism 1x is assembled as one unit in which an electronic circuit section, consisting of the read/write circuit 5a and the drive control circuit 6a connected to a plurality of magnetic disc drives (mechanical portion), and one mechanical portion, substantially similar in arrangement to the magnetic disc drive mechanism 1y, are supported by a common base (not shown). On the other hand, the magnetic disc drive mechanisms 1y is a unit only comprising the mechanism portion. The arrangement of the control circuit incorporated in the magnetic disc drive mechanism 1x will be described in detail below.

The connector 3 is substantially similar in arrangement and mode of operation to that described above with reference to FIG. 1, and inputs or outputs the signals ! transmitted through signal lines 15-18. The interface 4 is substantially similar in arrangement to the conventional interfaces except that the interface 4 of FIG. 2 has a dip switches for connecting two of four signal lines 16 to the signal lines 19x and 19y.

In this embodiment, the read/write circuit 5a and the drive control circuit 6a are so designed and arranged as to control the mechanial portion of the magnetic disc drive mechanisms 1x and 1y, and the magnetic disc drive mechanisms 1x and 1y are different in arrangement so that in order to mount the magnetic disc drive mechanism 1y detachably, the disc drive mechanism 1y is connected through electrical connection means 5b and 6b. In response to the state of the signal line 19x or 19y, the drive control circuit 6a controles the magnetic disc drive mechanism 1x or 1y to write data on or read data from the floppy disc 11. In this case, in response to the state of the signal line 19x or 19y, the drive control circuit 6a selects the magnet head 14 or 14' through the read/write circuit 5a. The signals are exchanged between the selected magnetic head and the read/write circuit 5a.

The read/write circuit 5a and the drive control circuit 6a must have such an arrangement that the signal delivered to the disc drive unit may be distributed to the magnetic disc drive mechanism 1x or 1y, and one of two signals from the magnetic disc drive mechanism 1x and 1y may be delivered to the data processing unit. In order to switch the input and output signals in the manner described above, the circuits shown in FIGS. 3 and 4 may be used.

Referring to FIG. 3, AND gates 21x and 21y receive the signals transmitted through the signal lines 19x and 19y, respectively, and the input signal I delivered from the data processing unit apparatus is applied to both AND gates 21x and 21y. The output from the AND gate 21x is delivered to a predetermined member (for instance, a motor) of the magnetic disc drive mechanism 1x, while the output from the AND gate 21y is delivered to the member of the magnetic disc drive mechanism 1y.

FIG. 4 illustrates a circuit for converting different output signals received from the magnetic disc drive mechanisms 1x and 1y, respectively, into a single to be delivered to the data processing unit. AND gate 22x and 22y receive the signals transmitted respectively transmitted through the signal lines 19x and 19y, and also receive the signals Ix, Iy (for instance, the output signals from the sensors) delivered from the magnetic disc drive mechanisms Ix and Iy. The outputs from the AND gates 22x and 22y are delivered to an OR gate 23 to become the signal to be delivered to the data processing unit.

The above-described circuits are designed and arranged based on positive logic, and thereby the signal received from the data processing unit can be distributed to the mechanical portions of the magnetic disc drive mechanisms 1x and 1y, and a suitable one of the signals delivered from the magnetic disc drive mechanisms 1x and 1y can be returned to the data processing unit.

In the case of writing or reading, the control mode of the data processing unit is substantially similar to that of the conventional data processing unit. When one of the signal lines 16 is made active by applying a suitable selection signal one of the signal lines 19x and 19y is made active. Therefore the drive control circuit 6a and the read/write circuit 5a select the mechanical portion of one of the magnetic disc drive mechanisms 1x and 1y so that the writing or reading operation can be carried out.

In accordance with the embodiment discribed above, if two disc drive mechanisms are connected, the circuitry of the control system is shared so that only one connector is needed. Further, the read/write circuit 5a and the drive control circuit 6a can be constituted by merely adding signal converting circuits as shown FIGS. 3 and 4 to the conventional arrangement.

Thus, it has become possible to control two disc drive mechanisms by employing about half of the circuitry used in conventional disc units. Another advantage is that the control mode of the data processing unit is the same as that of the conventional unit, so that no special control mode is required.

The embodiment described above with reference to FIG. 2 may be adapted for use in a system in which the magnetic disc drive mechanism 1y for instance, is an optional one which is installed when the user demands. In this case, the magnetic disc drive mechanism 1y may comprises only a mechanical mechanism, so that it can be made compact in size and light in weight and inexpensive in cost. Thus, a user can obtain an additional magnetic disc mechanism at a reduced price.

So far the control system has been described for controlling two magnetic disc drive mechanisms commonly, but it is to be understood that it may control three or more.

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A disc unit comprising:
   a first disc drive mechanism for driving a disc, said first disc drive mechanism being integrally fixed to said disc unit;
   means for connecting to said disc unit, when necessary, a second disc for driving a disc; and
   a control circuit for commonly controlling said first disc. drive mechanism and said second disc drive mechanism, if it is connected to said disc unit by said means for connecting, so as to selectively read data from or write data onto one disc at a time,
   wherein each of said first and second disc drive mechanism includes a spindle motor for driving said disc, a head for writing data into and/or reading data from the flat surface of the disc, and a head driving motor for moving said head, and
   wherein said control circuit controls the rotation of said spindle motors of said first and second disc drive mechanisms and the rotation of the head driving motors of said first and second disc drive mechanisms.

2. A disc unit as claimed in claim 1, wherein said control circuit comprises switching circuit means for switching paths of signals exchanged between a host apparatus and said first disc drive mechanism, or between said host apparatus and said second disc drive mechanism if connected to said disc drive unit by said means for connecting, in response to a selection signal from said host apparatus.

3. A disc unit as claimed in claim 1, wherein said first disc drive mechanism further includes a first track-zero sensor, a first index sensor, and a first write-protect sensor which are permanently connected to said control circuit, and wherein said second disc drive mechanism further includes a second track-zero sensor, a second index sensor, and a second write-protect sensor which are connectable to said control circuit via said means for connecting.

4. A disc drive unit comprising:
   a first disc drive mechanism for driving a disc, and first disc drive mechanism being integrally fixed to said disc unit;
   means for connecting to said disc unit, if necessary, a second disc drive mechanism for driving a disc; and
   a control circuit for controlling said first disc drive mechanism, and said second disc drive mechanism if it is connected to said disc unit by said means for connecting, in selectively exchanging data with one disc at a time,
   wherein each of said first and second disc drive mechanism includes a spindle motor for driving a disc, a head for reading data from or writing data into the disc, and a head driving motor for moving said head, and
   wherein said control circuit includes means for controlling the rotation of said spindle motors of said first and second disc drive mechanisms, and the rotation of the head driving motors of said first and second disc drive mechanism, and means for exchanging signals with said heads of said first and second disc drive mechanisms.

* * * * *